US009452534B2

(12) United States Patent
Igarashi et al.

(10) Patent No.: US 9,452,534 B2
(45) Date of Patent: Sep. 27, 2016

(54) HORIZONTAL ARTICULATED ROBOT, AND METHOD OF CONTROLLING THE SAME

(71) Applicant: Seiko Epson Corporation, Tokyo (JP)

(72) Inventors: Katsuji Igarashi, Chino (JP); Masaki Motoyoshi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/804,928

(22) Filed: Jul. 21, 2015

(65) Prior Publication Data

US 2015/0321357 A1 Nov. 12, 2015

Related U.S. Application Data

(63) Continuation of application No. 14/227,439, filed on Mar. 27, 2014, now Pat. No. 9,114,539, which is a continuation of application No. 13/400,922, filed on Feb. 21, 2012, now Pat. No. 8,831,781.

(30) Foreign Application Priority Data

Feb. 22, 2011 (JP) ................................. 2011-035860

(51) Int. Cl.
  *G05B 15/00* (2006.01)
  *G05B 19/00* (2006.01)
  (Continued)

(52) U.S. Cl.
  CPC ............ *B25J 13/088* (2013.01); *B25J 9/1641* (2013.01); *B25J 9/1694* (2013.01); *B25J 19/02* (2013.01); *Y10S 901/02* (2013.01); *Y10S 901/09* (2013.01); *Y10S 901/46* (2013.01)

(58) Field of Classification Search
  CPC ........ B25J 9/042; B25J 9/023; B25J 13/088; B25J 19/02; B25J 9/1694; Y10S 901/09; Y10S 901/46
  USPC ........ 700/245, 255, 258, 260, 261; 901/8, 9, 901/14, 19, 46
  See application file for complete search history.

(56) References Cited

U.S. PATENT DOCUMENTS 4,366,423 A * 12/1982 Inaba ............... G05B 19/41825
                                                  318/532
4,620,829 A * 11/1986 Herve .................. B25J 19/0016
                                                  414/720

(Continued)

FOREIGN PATENT DOCUMENTS

CN        101180789 A    5/2008
JP        4-294986 A    10/1992

(Continued)

*Primary Examiner* — Khoi Tran
*Assistant Examiner* — Jorge Peche
(74) *Attorney, Agent, or Firm* — Harness, Dickey & Pierce, P.L.C.

(57) ABSTRACT

A robot includes a first horizontal arm coupled to a base, a second horizontal arm coupled to the base via the first horizontal arm, first and second motors adapted to rotate the respective arms, and first and second encoders adapted to calculate rotational angles and rotational velocities of the respective motors. A first motor control section subtracts first and second angular velocities based on the first and second encoders from a sensor angular velocity detected by an angular sensor, and controls the first motor so that a velocity measurement value obtained by adding a vibration velocity based on a vibration angular velocity as the subtraction result and a first rotational velocity becomes equal to a velocity command value.

11 Claims, 3 Drawing Sheets

(51) Int. Cl.
   *B25J 13/08*     (2006.01)
   *B25J 9/16*      (2006.01)
   *B25J 19/02*     (2006.01)

(56) References Cited

U.S. PATENT DOCUMENTS

| | | | | |
|---|---|---|---|---|
| RE32,414 E | * | 5/1987 | Hutchins | B25J 9/041 318/568.1 |
| 4,705,999 A | * | 11/1987 | Soji | G05B 19/416 318/568.18 |
| 4,706,004 A | * | 11/1987 | Komatsu | B24B 17/10 318/568.14 |
| 4,795,957 A | * | 1/1989 | MacNeal, Jr. | B25J 9/1676 200/334 |
| 4,859,139 A | * | 8/1989 | Torii | B25J 9/0009 414/719 |
| 5,047,700 A | * | 9/1991 | Szakaly | G05B 19/427 318/568.1 |
| 5,605,487 A | * | 2/1997 | Hileman | B24B 37/04 451/11 |
| 5,635,787 A | * | 6/1997 | Mori | G01C 19/5649 310/321 |
| 5,764,013 A | * | 6/1998 | Yae | B25J 9/042 318/568.11 |
| 6,121,743 A | * | 9/2000 | Genov | B25J 9/042 318/568.11 |
| 6,205,839 B1 | * | 3/2001 | Brogårdh | B25J 9/1692 318/568.16 |
| 6,837,978 B1 | * | 1/2005 | Olgado | C25D 21/12 204/224 R |
| 7,422,412 B2 | * | 9/2008 | Akaha | B25J 9/042 414/744.5 |
| 7,752,939 B2 | * | 7/2010 | Ono | B25J 9/042 74/490.03 |
| 7,765,023 B2 | * | 7/2010 | Oaki | B25J 9/1692 700/157 |
| 8,393,243 B2 | * | 3/2013 | Ono | B25J 9/042 414/680 |
| 8,463,440 B2 | * | 6/2013 | Motoyoshi | B25J 9/1638 318/568.18 |
| 9,014,849 B2 | * | 4/2015 | Motoyoshi | B25J 9/1694 700/245 |
| 9,120,228 B2 | * | 9/2015 | Motoyoshi | B25J 9/1653 |
| 2001/0020388 A1 | * | 9/2001 | Inoue | G01C 19/5607 73/514.12 |
| 2003/0168346 A1 | * | 9/2003 | Hey | H01L 21/67028 205/157 |
| 2004/0020780 A1 | * | 2/2004 | Hey | H01L 21/2885 205/137 |
| 2005/0079042 A1 | * | 4/2005 | Maeda | B25J 9/042 414/744.2 |
| 2005/0246061 A1 | * | 11/2005 | Oaki | B25J 9/1692 700/245 |
| 2006/0071625 A1 | * | 4/2006 | Nakata | B25J 9/1633 318/568.12 |
| 2006/0133918 A1 | * | 6/2006 | Akaha | B25J 9/042 414/744.5 |
| 2006/0201275 A1 | * | 9/2006 | Ono | B25J 9/1025 74/490.01 |
| 2007/0110555 A1 | * | 5/2007 | Ono | B25J 9/1065 414/744.5 |
| 2008/0111451 A1 | * | 5/2008 | Ochi | G01C 19/5607 310/321 |
| 2008/0222883 A1 | * | 9/2008 | Ono | B23P 21/004 29/787 |
| 2009/0058346 A1 | | 3/2009 | Marushita et al. | |
| 2010/0050806 A1 | * | 3/2010 | Ono | B25J 9/044 74/490.02 |
| 2010/0076601 A1 | * | 3/2010 | Matsuo | B25J 9/1633 700/261 |
| 2010/0103431 A1 | * | 4/2010 | Demopoulos | B25J 9/1692 356/622 |
| 2010/0236351 A1 | * | 9/2010 | Ono | B25J 9/042 74/490.01 |
| 2010/0318223 A1 | * | 12/2010 | Motoyoshi | B25J 9/1638 700/253 |
| 2011/0004343 A1 | * | 1/2011 | Iida | B25J 9/1638 700/253 |
| 2011/0104742 A1 | * | 5/2011 | Fox | G01N 35/0095 435/30 |
| 2012/0035763 A1 | * | 2/2012 | Motoyoshi | B25J 9/1694 700/258 |
| 2012/0215353 A1 | * | 8/2012 | Izumi | B25J 9/1641 700/254 |
| 2012/0215356 A1 | * | 8/2012 | Igarashi | B25J 9/1641 700/258 |
| 2012/0277912 A1 | * | 11/2012 | Kirihara | B25J 9/1653 700/258 |
| 2013/0190926 A1 | * | 7/2013 | Motoyoshi | B25J 9/1653 700/254 |

FOREIGN PATENT DOCUMENTS

| | | |
|---|---|---|
| JP | 04294986 A * | 10/1992 |
| JP | 2005-242794 A | 9/2005 |
| JP | 2011-020188 A | 2/2011 |

* cited by examiner

HORIZONTAL ARTICULATED ROBOT, AND METHOD OF CONTROLLING THE SAME

CROSS-REFERENCE TO RELATED APPLICATIONS

This is a continuation application of U.S. application Ser. No. 14/227,439, filed Mar. 27, 2014, which is a continuation application of U.S. application Ser. No. 13/400,922 filed Feb. 21, 2012, now U.S. Pat. No. 8,831,781 issued Sep. 9, 2014, which claims priority to Japanese Patent Application No. 2011-035860, filed Feb. 22, 2011, all of which are expressly incorporated by reference herein in their entireties.

BACKGROUND

1. Technical Field

The present invention relates to a horizontal articulated robot equipped with an angular velocity sensor, and a method of controlling the horizontal articulated robot.

2. Related Art

In the past, there has been known a horizontal articulated robot which performs damping control of the arm using an angular velocity sensor for detecting the angular velocity of the arm as described in JP-A-2005-242794 (Document 1). A first arm is coupled to a base of the horizontal articulated robot described in Document 1 so as to be able to rotate with respect to the base, and a second arm is coupled to the tip of the first arm so as to be able to rotate with respect to the first arm. Further, when the first arm rotates due to the drive force of a first drive source, the rotational angle of the first arm is detected by a first angle sensor for detecting the rotational angle of the first drive source, and the angular velocity of the first arm with respect to the base is detected by a first angular velocity sensor mounted on the first arm. On this occasion, in the robot controller for controlling the driving procedure of the first drive source, feedback control is performed on the first drive source based on the data detected by the first angle sensor and the first angular velocity sensor so that the data to be detected become equal to predetermined values.

Further, when the second arm rotates due to the drive force of a second drive source, the rotational angle of the second arm is detected by a second angle sensor for detecting the rotational angle of the second drive source, and the angular velocity of the second arm with respect to the base is detected by a second angular velocity sensor mounted on the second arm. On this occasion, in the robot controller described above, feedback control is performed on the second drive source based on the data detected by the second angle sensor and the second angular velocity sensor so that the data to be detected become equal to predetermined values similarly to the control procedure with respect to the first drive source. Thus, the damping control of the first and second arms is performed.

Incidentally, in order to drive the angular velocity sensors described above, it becomes necessary to connect a variety of electric wires such as wires for supplying the angular velocity sensors with electricity or wires for transmitting the detection signals of the angular velocity sensors between the angular velocity sensors and the controller. Such electric wires are also required for the drive sources besides the angular velocity sensors, and are generally connected to an external controller through a hollow substrate. Therefore, in the case of respectively disposing the angular velocity sensors to the first and second arms as in the case of the horizontal articulated robot described above, the same number of electric wires as the number of angular velocity sensors are required. As a result, the work of laying the electric wires for the angular velocity sensors around becomes cumbersome.

Incidentally, the vibration caused in the first arm is generally amplified by another arm coupled to the first arm, and then reaches an end effector of the horizontal articulated robot. Therefore, it is true that it is also possible to reluctantly omit the second angle sensor and the second angular velocity sensor described above, and at the same time perform only the damping control of the first drive source based on the detection result of the first angular velocity sensor to thereby suppress the vibration of the end effector. However, the track drawn by the first arm with respect to the base generally includes a larger number of tracks with small curvature compared to the tracks drawn by other arms with respect to the base. Therefore, the chances of folding the electric wires drawn from the first arm increase, and further, the curvature in the folded portions also becomes smaller compared to the electric wires drawn from other arms. Therefore, since the electric wires connected to the first angular velocity sensor are required to have higher durability than the electric wires connected to the second angular velocity sensor, after all, it results that restrictions related to the layout of such electric wires and cumbersomeness of laying the electric wires around still remain.

SUMMARY

An advantage of some aspects of the invention is to provide a horizontal articulated robot and a method of controlling a horizontal articulated robot which makes it possible to reduce the number of angular velocity sensors used for damping control, and to lower the durability required to the electric wire connected to the angular velocity sensors.

An aspect of the invention is directed to a horizontal articulated robot including a first arm having a base end coupled to a base via at least a joint, and rotating due to drive of a first motor, a first velocity measurement section adapted to measure a rotational velocity of the first motor, a control section adapted to perform feedback control on the first motor so that a velocity measurement value based on the measurement value of the first velocity measurement section becomes equal to a velocity command value, a second arm coupled to a tip of the first arm, and rotating due to drive of a second motor, a second velocity measurement section adapted to measure a rotational velocity of the second motor, an angular velocity calculation section adapted to calculate an angular velocity of the first arm based on the rotational velocity of the first motor, and calculate an angular velocity of the second arm based on the rotational velocity of the second motor, and an angular velocity sensor disposed on the second arm, and adapted to detect an angular velocity, wherein the control section subtracts the angular velocity of the first arm and the angular velocity of the second arm from the detection value of the angular velocity sensor to thereby calculate a vibration velocity as a rotational velocity of the first motor corresponding to a vibration angular velocity as a result of the subtraction based on the vibration angular velocity, and then uses a value obtained by adding the measurement value of the first velocity measurement section and the vibration velocity to each other as the velocity measurement value.

According to the horizontal articulated robot of this aspect of the invention, the angular velocity detected by the angular velocity sensor is an angular velocity including the angular velocities of the respective arms based on the rotational velocities of the corresponding motors and the angular velocities of the respective arms based on the vibration. Therefore, it is possible to obtain the vibration angular velocity as the angular velocity of the arm due to the vibration by obtaining the angular velocity of the arm based on the rotational velocity of the corresponding motor for each of the arms, and then subtracting the angular velocity thus obtained from the angular velocity detected by the angular velocity sensor. In the horizontal articulated robot having the configuration described above, the angular velocities of the first and second arms are calculated based on the measurement values of the first and second velocity measurement sections, and these angular velocities are subtracted from the detection value of the angular velocity sensor to thereby calculate the vibration angular velocity. Then, the first motor is controlled so that the velocity measurement value, which is a value obtained by adding the vibration velocity as the rotational velocity of the first motor corresponding to the vibration angular velocity, and the measurement value of the first velocity measurement section to each other becomes equal to the velocity command value. In other words, since the first motor is controlled so that the rotational velocity of the first motor taking the component of the vibration of the arm into consideration becomes equal to the velocity command value, the vibration of the first arm can be suppressed. In other words, since it becomes unnecessary to dispose the angular velocity sensor on the first arm, it is possible to reduce the number of angular velocity sensors disposed, and at the same time, reduce the number of electric wires connected to the velocity sensors. As a result, the work of laying the electric wires related to the angular velocity sensors can be prevented from becoming cumbersome. Moreover, since the angular velocity sensor is disposed on the second arm, it is possible to reduce the chances of folding the wires, and to increase the curvature of the wires at the folded portions compared to the electric wires connected to the angular velocity sensor disposed on the first arm. As a result, the durability required for the electric wires connected to the angular velocity sensor can also be lowered.

The horizontal articulated robot of the above aspect of the invention may further include a first position detection section adapted to detect a rotational angle of the first motor, and the control section may calculate the velocity command value based on a deviation between a detection value of the first position detection section and a position command value.

According to the horizontal articulated robot described above, since the velocity command value is the deviation between the detection value of the first position detection section and the position command value, it is possible to control the position of the first arm to be located at the position indicated by the position command value while suppressing the vibration of the first arm.

The horizontal articulated robot of the above aspect of the invention may further include a second position detection section adapted to detect a rotational angle of the second motor, the first velocity measurement section may calculate the rotational velocity of the first motor based on a detection value of the first position detection section, and the second velocity measurement section may calculate the rotational velocity of the second motor based on a detection value of the second position detection section.

According to the horizontal articulated robot described above, the first velocity measurement section can calculate the rotational velocity of the first motor based on a detection value of the first position detection section. Further, the second velocity measurement section can calculate the rotational velocity of the second motor based on a detection value of the second position detection section.

The horizontal articulated robot of the above aspect of the invention may be configured such that the first arm is an arm coupled to the base via the joint.

According to the horizontal articulated robot described above, the damping control of the arm coupled to the base can be performed.

Another aspect of the invention is directed to a method of controlling a horizontal articulated robot including: measuring a rotational velocity of a first motor adapted to rotate a first arm having a base end coupled to a base via at least a joint, performing feedback control on the first motor so that a velocity measurement value based on the rotational velocity measured becomes equal to a velocity command value, measuring a rotational velocity of a second motor adapted to rotate a second arm coupled to a tip of the first arm, calculating an angular velocity of the first arm based on the measured rotational velocity of the first motor, calculating an angular velocity of the second arm based on the measured rotational velocity of the second motor, and obtaining a detection value of an angular velocity sensor disposed on the second arm, wherein the angular velocity of the first arm and the angular velocity of the second arm are subtracted from the detection value of the angular velocity sensor to thereby calculate a vibration velocity as a rotational velocity of the first motor corresponding to a vibration angular velocity as a result of the subtraction based on the vibration angular velocity, and then a value obtained by adding the rotational velocity of the first motor and the vibration velocity to each other is used as the velocity measurement value.

According to the method of controlling a horizontal articulated robot of this aspect of the invention, since the damping control of the first arm can be performed based on the detection value of the angular velocity sensor disposed on the second arm, it is possible to reduce the number of angular velocity sensors disposed, and at the same time, reduce the number of electric wires connected to the angular velocity sensors. As a result, the work of laying the electric wires related to the angular velocity sensors can be prevented from becoming cumbersome. Moreover, since the angular velocity sensor is disposed on the second arm, it is possible to reduce the chances of folding the wires, and to increase the curvature of the wires at the folded portions compared to the electric wires connected to the angular velocity sensor disposed on the first arm. As a result, the durability required for the electric wires connected to the angular velocity sensor can also be lowered.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a horizontal articulated robot according to an embodiment of the invention will be explained with reference to FIGS. 1 through 3.

Figure 1:
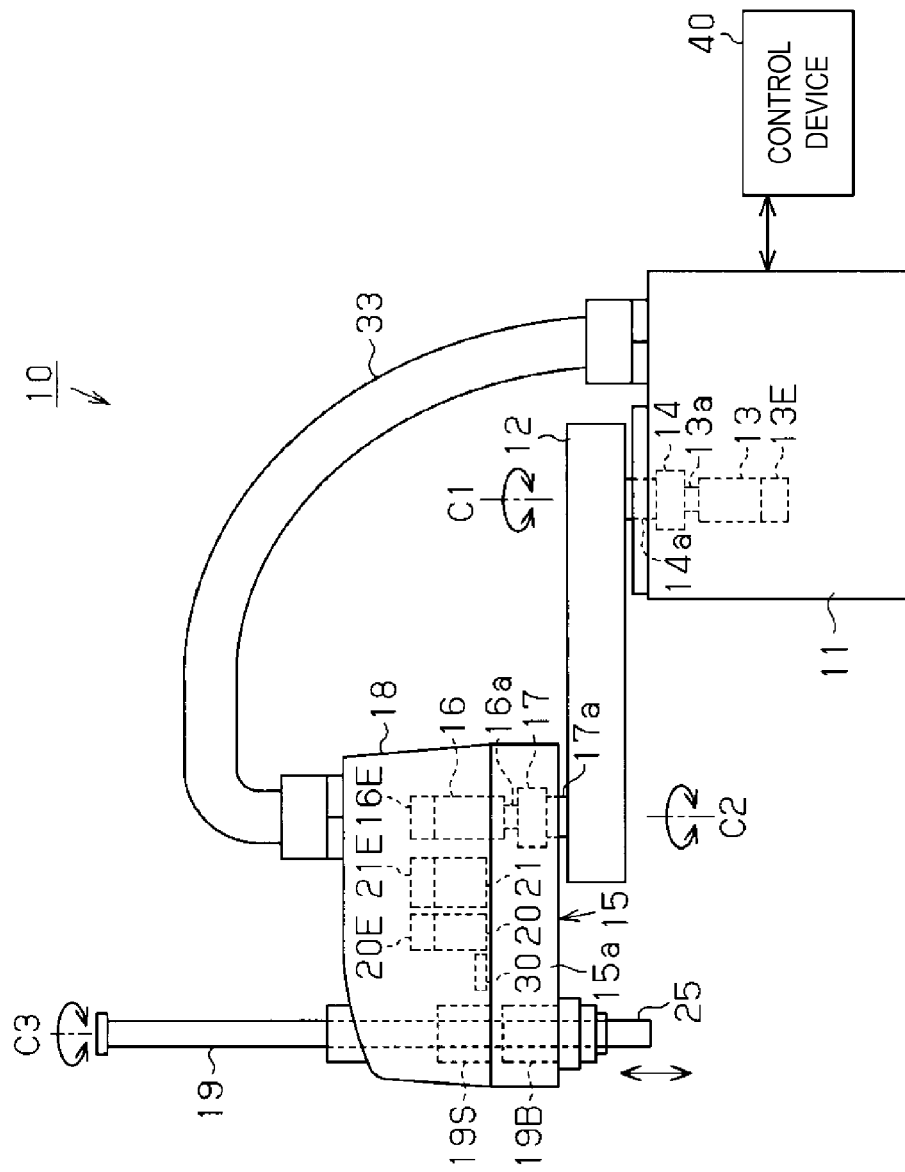
FIG. 1 is a front view showing a front structure of a robot according to an embodiment of the invention.

As shown in FIG. 1, a base end portion of a first horizontal arm 12 as a first arm rotating around a shaft center C1 along the vertical direction with respect to a base 11 of the robot 10 is coupled to an upper end portion of the base 11. Inside the base 11, there are disposed a first electric motor 13 for rotating the first horizontal arm 12, and a first reduction gear 14 coupled to a rotating shaft 13a of the first electric motor and having an output shaft 14a fixedly coupled to the first horizontal arm 12. Further, when the drive force of the first electric motor 13 is transmitted to the first horizontal arm 12 via the first reduction gear 14, the first horizontal arm 12 rotates in a horizontal plane with respect to the base 11. Further, the first electric motor 13 is provided with a first encoder 13E as a first position detection section for outputting a pulse signal corresponding to the amount of rotation of the first electric motor 13.

To the tip portion of the first horizontal arm 12, there is coupled a second horizontal arm 15 as a second arm rotating around the shaft center C2 along the vertical direction with respect to the first horizontal arm 12. Inside an arm main body 15a constituting the second horizontal arm 15, there are disposed a second electric motor 16 for rotating the second horizontal arm 15, and a second reduction gear 17 coupled to a rotating shaft 16a of the second electric motor 16 and having an output shaft 17a fixedly coupled to the first horizontal arm 12. Further, when the drive force of the second electric motor 16 is transmitted to the second horizontal arm 15 via the second reduction gear 17, the second horizontal arm 15 rotates around the shaft center C2 in a horizontal plane with respect to the first horizontal arm 12. Further, the second electric motor 16 is provided with a second encoder 16E as a second position detection section for outputting a pulse signal corresponding to the amount of rotation of the second electric motor 16. Above the arm main body 15a, there is disposed an arm cover 18 for entirely covering the arm main body 15a.

On the tip portion of the second horizontal arm 15, there is disposed a spline shaft 19 penetrating the arm main body 15a and the arm cover 18 and displaced with respect to the second horizontal arm 15. The spline shaft 19 is inserted so as to fit into a spline nut 19S disposed on the tip portion of the second horizontal arm 15, and is supported rotatably and movably in the vertical direction with respect to the second horizontal arm 15.

Inside the second horizontal arm 15, there is installed a rotary motor 20, and the drive force of the rotary motor 20 is transmitted to the spline nut 19S via a belt not shown. When the rotary motor 20 rotates the spline nut 19S positively and negatively, the spline shaft 19 rotates positively and negatively around the shaft center C3 along the vertical direction. The rotary motor 20 is provided with a third encoder 20E for outputting a pulse signal corresponding to the amount of rotation of the rotary motor 20.

Inside the second horizontal arm 15, there is installed a lifting motor 21 for rotating a ball screw nut 19B positively and negatively. When the lifting motor 21 rotates the ball screw nut 19B positively and negatively, the spline shaft 19 rises and falls in the vertical direction. The lifting motor 21 is provided with a fourth encoder 21E for outputting a pulse signal corresponding to the amount of rotation of the lifting motor 21. A work section 25 coupled to a lower end of the spline shaft 19 is arranged to be able to be attached with, for example, a device for gripping a conveyed object, and a device for processing a processed object.

Further, inside the second horizontal arm 15, there is disposed an angular velocity sensor 30 for measuring the angular velocity of the second horizontal arm with respect to the base 11. As the angular velocity sensor 30, there is adopted a vibratory gyroscope using a quartz crystal vibrator in the present embodiment. To the upper side of the second horizontal arm 15, there is coupled one end of a wiring duct 33 having flexibility as a piping member having the other end coupled to the base 11. The electric wires connected to the devices installed inside the second horizontal arm 15 such as the second electric motor 16, the second encoder 16E, the rotary motor 20, and the lifting motor 21 are laid around from the inside of the second horizontal arm 15 to the inside of the base 11 through the wiring duct 33. Further, the electric wires laid around from the inside of the second horizontal arm 15 to the inside of the base 11 are bundled in the inside of the base 11 to thereby be laid around to a control device 40, which is installed in the outside of the base 11 to perform overall control of the robot 10 with the electric wires connected to the first electric motor 13 and the first encoder 13E. The control device 40 calculates the angular velocity of the first horizontal arm 12 based on a variety of signals input from the angular velocity sensor 30 and so on, and controls the first electric motor 13 so that the vibration of the second horizontal arm 15 is suppressed.

Hereinafter, an electrical configuration of the control device 40 will be described with reference to FIG. 2.

Figure 2:
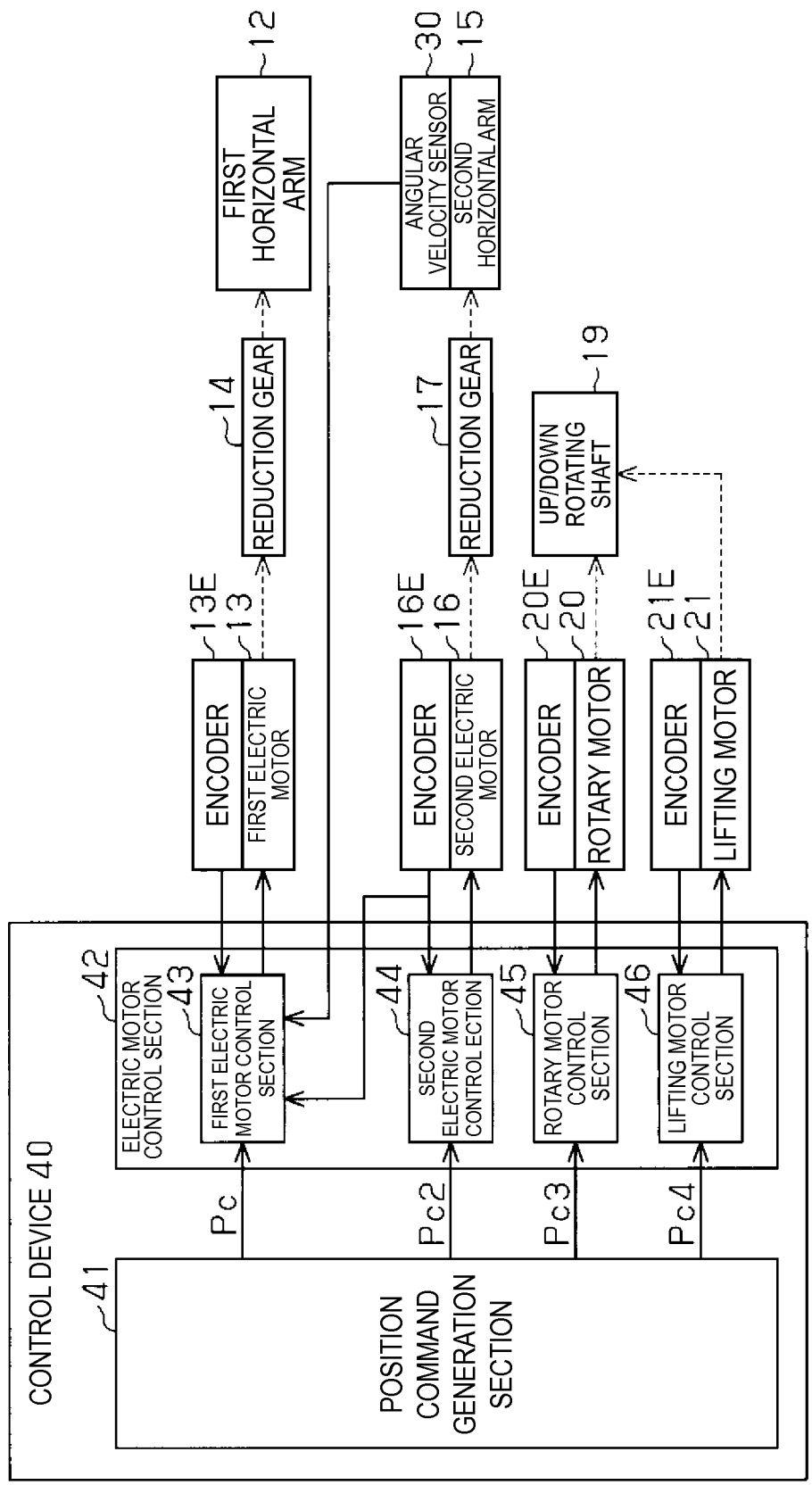
FIG. 2 is an electric circuit block diagram showing an electrical configuration of the robot.

As shown in FIG. 2, a position command generation section 41 of the control device 40 calculates the target position of the work section 25 based on the content of the process to be performed by the robot 10, and then generates a track for moving the work section 25 to the target position. Further, the position command generation section 41 calculates the rotational angle of each of the motors 13, 16, 20, and 21 for each predetermined control period so that the work section 25 moves along the track, and then outputs the target rotational angles as a result of the calculation to a motor control section 42 as a first position command Pc, a second position command Pc2, a third position command Pc3, and a fourth position command Pc4, respectively.

The motor control section 42 is composed of a first electric motor control section 43, a second electric motor control section 44, a rotary motor control section 45, and a lifting motor control section 46.

Detection signals from the first encoder 13E, the second encoder 16E, and the angular velocity sensor 30 are input to the first electric motor control section 43 besides the first position command Pc as a position command value. The first electric motor control section 43 drives the first electric motor 13 by feedback control using the detection signals so that the rotational angle calculated from the detection signal of the first encoder 13E becomes equal to the first position command Pc.

Besides the second position command Pc2, the detection signal from the second encoder 16E is input to the second electric motor control section 44. The second electric motor control section 44 drives the second electric motor 16 by feedback control using these signals so that the rotational angle calculated from the detection signal of the second encoder 16E becomes equal to the second position command Pc2.

Besides the third position command Pc3, the detection signal from the third encoder 20E is input to the rotary motor control section 45. The rotary motor control section 45 drives the rotary motor 20 by feedback control using these signals so that the rotational angle calculated from the detection signal of the third encoder 20E becomes equal to the third position command Pc3.

Besides the fourth position command Pc4, the detection signal from the fourth encoder 21E is input to the lifting motor control section 46. The lifting motor control section 46 drives the lifting motor 21 by feedback control using these signals so that the rotational angle calculated from the detection signal of the fourth encoder 21E becomes equal to the fourth position command Pc4.

Then, a configuration of the first electric motor control section 43 will be explained with reference to FIG. 3.

Figure 3:
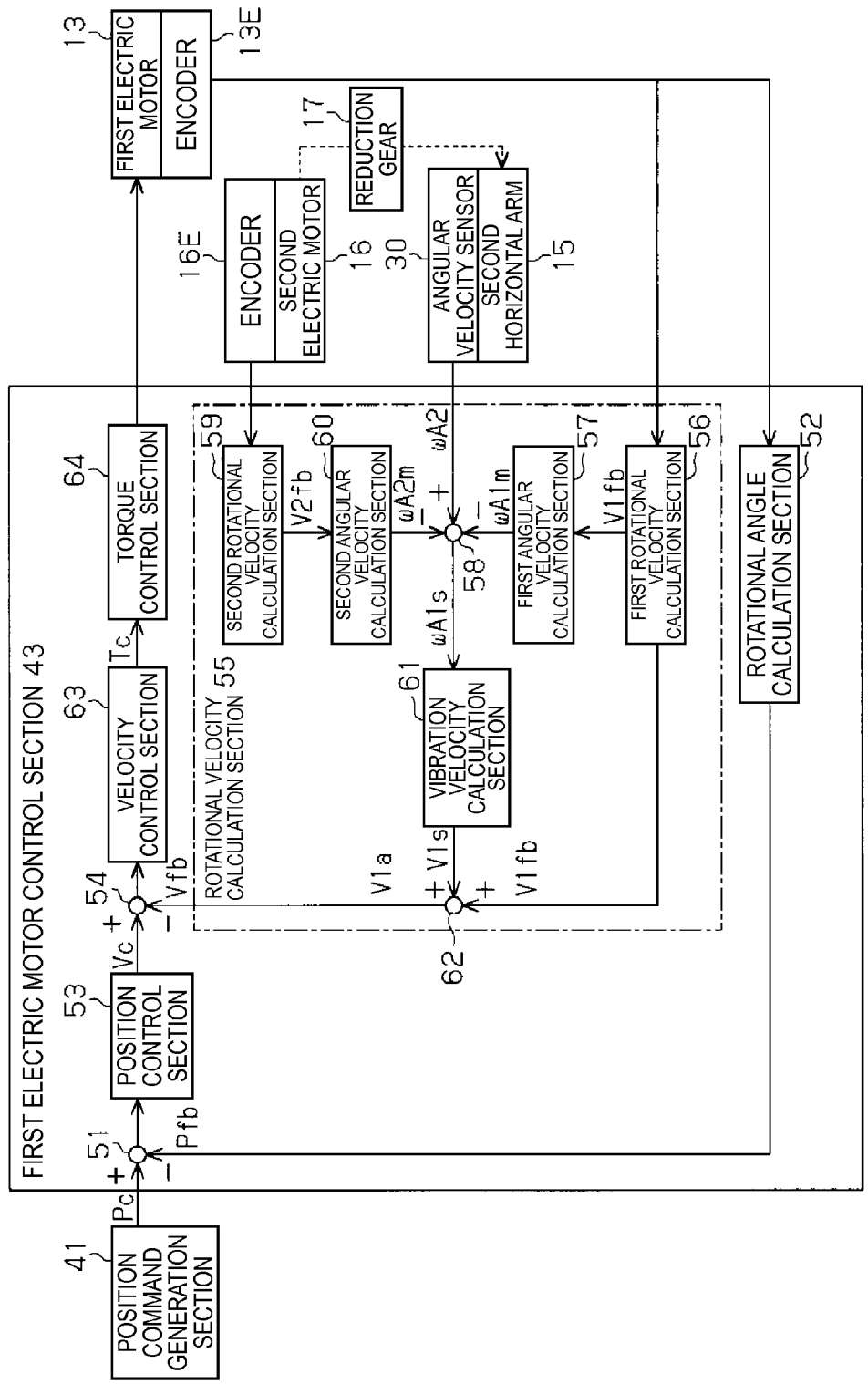
FIG. 3 is a functional block diagram showing a functional configuration of a first electric motor control section.

As shown in FIG. 3, to a first subtractor 51 of the first electric motor control section 43, there are input the first position command Pc from the position command generation section 41, and a position feedback value Pfb from a rotational angle calculation section 52. In the rotational angle calculation section 52, the number of pulses input from the first encoder 13E is counted, and at the same time, the rotational angle of the first electric motor 13 corresponding to the first encoder 13E is output to the first subtractor 51 as a position feedback value Pfb. The first subtractor 51 outputs the deviation between the first position command Pc and the position feedback value Pfb to a position control section 53.

The position control section 53 multiplies the deviation input from the first subtractor 51 by a position proportional gain Kp as a predetermined coefficient to thereby calculate a rotational velocity of the first electric motor 13 corresponding to the deviation. The position control section 53 outputs the signal representing a velocity command value as the rotational velocity of the first electric motor 13 to a second subtractor 54 as the velocity command Vc.

Besides the velocity command Vc described above, a velocity feedback value Vfb as a velocity measurement value is input to the second subtractor 54 from a rotational velocity calculation section 55. The second subtractor 54 outputs the deviation between the velocity command Vc and the velocity feedback value Vfb to a velocity control section 63.

The velocity control section 63 performs a predetermined calculation process using, for example, a velocity proportional gain Kv as a predetermined coefficient on the deviation input from the second subtractor 54 to thereby output a torque command Tc of the first electric motor 13 corresponding to the deviation to a torque control section 64. The torque control section 64 generates a current corresponding to the torque command Tc, and then supplies it to the first electric motor 13.

Then, the configuration of the rotational velocity calculation section 55 will be explained in detail.

The rotational velocity calculation section 55 is composed of a first rotational velocity calculation section 56, a first angular velocity calculation section 57, an adder-subtractor 58, a second rotational velocity calculation section 59, a second angular velocity calculation section 60, a vibration velocity calculation section 61, and an adder 62.

In the first rotational velocity calculation section 56 as a first velocity measurement section, the pulse signal is input from the first encoder 13E, and the first rotational velocity V$1fb$ as a rotational velocity of the first electric motor 13 is calculated based on the frequency of the pulse signal. Further, the first rotational velocity calculation section 56 outputs the first rotational velocity V$1fb$ to the first angular velocity calculation section 57 and the adder 62.

In the first angular velocity calculation section 57 constituting the angular velocity calculation section, a reduction ratio N1 of the first reduction gear 14 and the first rotational velocity V$1fb$ are multiplied by each other to thereby calculate a first angular velocity $\omega A1m$ as the angular velocity of the first horizontal arm 12 based on the rotational velocity of the first electric motor 13. Then, the first angular velocity calculation section 57 outputs the first angular velocity $\omega A1m$ to the adder-subtractor 58.

In the second rotational velocity calculation section 59 as a second velocity measurement section constituting the angular velocity calculation section, the pulse signal is input from the second encoder 16E, and the second rotational velocity V$2fb$ of the second electric motor 16 is calculated based on the frequency of the pulse signal. Further, the second rotational velocity calculation section 59 outputs the second rotational velocity V$2fb$ to the second angular velocity calculation section 60.

In the second angular velocity calculation section 60, a reduction ratio N2 of the second reduction gear 17 and the second rotational velocity V$2fb$ are multiplied by each other to thereby calculate a second angular velocity $\omega A2m$ as the angular velocity of the second horizontal arm 15 based on the rotational velocity of the second electric motor 16. Then, the second angular velocity calculation section 60 outputs the second angular velocity $\omega A2m$ to the adder-subtractor 58.

In addition to the first angular velocity $\omega A1m$ and the second angular velocity $\omega A2m$, a sensor angular velocity $\omega A2$ as a detection signal of the angular velocity sensor 30 is input to the adder-subtractor 58. Here, in the robot 10 composed of the constituents described above, the second horizontal arm 15 on which the angular velocity sensor 30 is disposed is rotating at an angular velocity obtained by combining the following angular velocities of:

A. the first angular velocity $\omega A1m$ corresponding to the rotational velocity of the first electric motor 13;

B. the second angular velocity $\omega A2m$ corresponding to the rotational velocity of the second electric motor 16; and C. a vibration angular velocity $\omega A1s$ based on the vibration reaching the second horizontal arm 15 via the first horizontal arm 12.

Therefore, the sensor angular velocity $\omega A2$ output by the angular velocity sensor 30 includes the first angular velocity $\omega A1m$, the second angular velocity $\omega A2m$, and the vibration angular velocity $\omega A1s$. In the adder-subtractor 58, the first angular velocity $\omega A1m$ (A) and the second angular velocity $\omega A2m$ (B) described above are subtracted from the sensor angular velocity $\omega A2$ described above. Then, the adder-subtractor 58 outputs the vibration angular velocity $\omega A1s$ as the subtraction result to the vibration velocity calculation section 61.

In the vibration velocity calculation section 61, the vibration angular velocity $\omega A1s$ is multiplied by a predetermined proportional gain Kgp to thereby calculate the rotational velocity of the first electric motor 13 for canceling out the vibration angular velocity $\omega A1s$ as a vibration velocity V$1s$. Then, the vibration velocity calculation section 61 outputs the vibration velocity V$1s$ as the calculation result to the adder 62.

In the adder 62, the first rotational velocity V$1fb$ and the vibration velocity V$1s$ are added to each other. The adder 62 outputs a corrected rotational velocity V$1a$ as the addition result to the second subtractor 54 as a velocity feedback value Vfb.

Then, the procedure of the control of the first electric motor 13 mainly by the first electric motor control section 43 among the operations of the robot 10 described above will be explained. When the first position command Pc is input to the first electric motor control section 43 from the position command generation section 41, the deviation between the first position command Pc and the position feedback value Pfb is output to the position control section 53. Subsequently, the velocity command Vc corresponding to the deviation is output from the position control section 53, and the deviation between the velocity command Vc and the velocity feedback value Vfb is output to the velocity control section 63.

On this occasion, since the velocity feedback value Vfb is equal to the additional value of the first rotational velocity V1fb and the vibration velocity V1s, the deviation input to the velocity control section 63 is arranged to have a value from which the component of the vibration velocity V1s is eliminated, namely a value for canceling out the vibration velocity V1s. Further, the torque command Tc corresponding to the deviation described above is output from the velocity control section 63, and subsequently, the current corresponding to the torque command Tc is supplied to the first electric motor 13 from the torque control section 64.

According to such a configuration, if, for example, the first horizontal arm 12 is rotating at an angular velocity higher than the velocity command Vc due to the vibration, the corrected rotational velocity V1a becomes lower than the first rotational velocity V1fb as much as an amount corresponding to the vibration velocity V1s. Such a torque command Tc based on the velocity deviation is a torque command for reducing the rotational velocity of the first electric motor 13 as much as an amount corresponding to the vibration described above while moving the first horizontal arm 12 to the position indicated by the first position command Pc. Therefore, as a result that the first electric motor 13 is driven by the torque command for canceling the vibration, damping of the first horizontal arm 12 is achieved.

Further, if, for example, the first horizontal arm 12 is rotating at an angular velocity lower than the velocity command Vc due to the vibration, the corrected rotational velocity V1a becomes higher than the first rotational velocity V1fb as much as an amount corresponding to the vibration velocity V1s. Such a torque command Tc based on the velocity deviation is a torque command for increasing the rotational velocity of the first electric motor 13 as much as an amount corresponding to the vibration while moving the first horizontal arm 12 to the position indicated by the first position command Pc. Therefore, as a result that the first electric motor 13 is also driven by the torque command for canceling the vibration, damping of the first horizontal arm 12 is achieved.

As explained hereinabove, according to the robot 10 related to the present embodiment, the advantages recited as follows can be obtained.

1. According to the embodiment described above, the damping control of the first horizontal arm 12 can be performed based on the sensor angular velocity ωA2 as the detection signal of the angular velocity sensor 30 disposed on the second horizontal arm 15. In other words, since it becomes unnecessary to dispose the angular velocity sensor 30 on the first horizontal arm 12, the number of electric wires connected to the angular velocity sensors can be reduced, and at the same time, the work of laying the electric wires around can be prevented from becoming cumbersome compared to the configuration of disposing the angular velocity sensors respectively on the first and second arms.

2. Moreover, since the angular velocity sensor 30 is disposed on the second horizontal arm 15, it is possible to reduce the chances of folding the wires, and to increase the curvature of the wires at the folded portions with respect to the electric wires connected to the angular velocity sensor 30 compared to the angular velocity sensor disposed on the first horizontal arm 12. As a result, the durability required for the electric wires connected to the angular velocity sensor 30 can be lowered.

3. According to the embodiment described above, since the velocity command Vc is a value based on the deviation between the position feedback value Pfb from the rotational angle calculation section 52 and the first position command Pc, it is possible to control the position of the first horizontal arm 12 to be located at the position indicated by the first position command Pc while suppressing the vibration of the first horizontal arm 12.

It should be noted that the embodiment described above can be put into practice with the following modifications if necessary.

In the embodiment described above, from the viewpoint of obtaining the corrected rotational velocity V1a of the first electric motor 13, it is also possible to adopt the configuration in which the first rotational velocity calculation section 56 and the first angular velocity calculation section 57 are reluctantly omitted. In the adder-subtractor 58 in such a configuration, it results that the difference between the sensor angular velocity ωA2 from the angular velocity sensor 30 and the second angular velocity ωA2m of the rotation due to the second electric motor 16 is output to the vibration velocity calculation section 61 as a calculation result with respect to the first horizontal arm 12. Further, it results that in the vibration velocity calculation section 61, by performing multiplication by the predetermined proportional gain Kgp, the corrected rotational velocity V1a is calculated. As a result, it is possible not only to obtain the advantages listed as 1 through 3 above, but also to simplify the configuration of the first electric motor control section 43.

The robot 10 according to the embodiment described above has the first horizontal arm 12 coupled to the base 11, and the second horizontal arm 15 coupled to the base 11 via the first horizontal arm 12. Besides this configuration, it is possible for the robot to have, for example, a third horizontal arm to be coupled to the base via the first and second horizontal arms 12, 15. Further, it is also possible for the first horizontal arm 12 to be coupled to a third horizontal arm coupled to the base 11, for example.

In the embodiment described above, the first rotational velocity calculation section 56 detects the rotational velocity of the first electric motor 13 based on the frequency of the pulse signal input from the first encoder 13E. Besides this configuration, from the viewpoint of calculating the rotational velocity of the first electric motor 13, it is also possible, for example, to separately dispose a velocity sensor to thereby calculate the rotational velocity of the first electric motor 13 from the detection value of the velocity sensor. It should be noted that the same can be applied to the second rotational velocity calculation section 59.

In the robot 10 according to the embodiment described above, the velocity command Vc corresponding to the deviation between the first position command Pc from the position command generation section 41 and the position feedback value Pfb calculated by the rotational angle calculation section 52 is calculated in the position control section 53. Besides this configuration, it is also possible to adopt the configuration in which the position command generation section 41 calculates the velocity command Vc for each control period in advance in accordance with the target position of the work section 25, and then outputs the velocity command Vc to the second subtractor 54 to thereby reluctantly omit the first subtractor 51, the rotational angle calculation section 52, and the position control section 53.

The first electric motor control section 43 according to the embodiment described above is provided with the first rotational velocity calculation section 56 for obtaining the first rotational velocity V1$fb$ of the first electric motor 13 based on the signal input from the first encoder 13E, and then outputting the first rotational velocity V1$fb$ to the first angular velocity calculation section 57.

Besides this configuration, it is also possible to adopt the configuration in which the first rotational velocity V1$fb$ can be input to the first angular velocity calculation section 57 from the outside of the first motor control section 43, or the configuration in which the first velocity calculation section 57 can obtain the first rotational velocity V1$fb$ using the signal from the first encoder 13E, to thereby reluctantly omit the first rotational velocity calculation section 56. It should be noted that the same can be applied to the second rotational velocity calculation section 59 and the second angular velocity calculation section 60.

What is claimed is:

1. A robot comprising:
a first arm;
a first motor that rotates the first arm;
a first sensor that detects an angle of the first arm and that outputs a first output;
a second arm connected to the first arm;
a second motor that rotates the second arm;
a second sensor that detects an angle of the second arm and that output a second output; and
an angular velocity sensor that is s disposed to the second arm and that outputs a third output; wherein
the first motor is controlled by the first, second and third outputs, and
the second motor is controlled by the second output without using the first output, wherein the second motor is controlled without using the third output.

2. The robot according to claim 1, wherein
the first motor is controlled based on a difference between the third output and an angular velocity calculated from the second output.

3. The robot according to claim 2, wherein
the second arm comprises a cover, and
the angular velocity sensor is disposed inside the cover.

4. The robot according to claim 2, wherein
the angular velocity sensor is a vibratory gyroscope.

5. The robot according to claim 4, wherein
the angular velocity sensor has a quartz crystal vibrator.

6. The robot according to claim 1, wherein
the second arm comprises a cover, and
the angular velocity sensor is disposed inside the cover.

7. The robot according to claim 6, wherein
the angular velocity sensor is a vibratory gyroscope.

8. The robot according to claim 7, wherein
the angular velocity sensor has a quartz crystal vibrator.

9. The robot according to claim 1, wherein
the angular velocity sensor is a vibratory gyroscope.

10. The robot according to claim 9, wherein
the angular velocity sensor has a quartz crystal vibrator.

11. The robot according to claim 1, wherein
the robot is a horizontal articulated robot.

* * * * *